United States Patent
Reinhart

(10) Patent No.: US 12,285,110 B2
(45) Date of Patent: Apr. 29, 2025

(54) BENCH SYSTEM AND METHOD

(71) Applicant: NICKOLAS BRANDS, LLC, Findlay, OH (US)

(72) Inventor: Nickolas Reinhart, Sarasota, FL (US)

(73) Assignee: Findlay Machine & Tool, LLC, Findlay, OH (US)

( * ) Notice: Subject to any disclaimer, the term of this patent is extended or adjusted under 35 U.S.C. 154(b) by 122 days.

(21) Appl. No.: 18/170,948

(22) Filed: Feb. 17, 2023

(65) Prior Publication Data
US 2023/0200544 A1 Jun. 29, 2023

Related U.S. Application Data

(63) Continuation-in-part of application No. 18/070,920, filed on Nov. 29, 2022.

(60) Provisional application No. 63/284,367, filed on Nov. 30, 2021.

(51) Int. Cl.
| | |
|---|---|
| *A47C 11/00* | (2006.01) |
| *A47C 3/04* | (2006.01) |
| *A47C 7/62* | (2006.01) |
| *A47C 1/16* | (2006.01) |
| *B64D 11/06* | (2006.01) |

(52) U.S. Cl.
CPC .............. *A47C 11/00* (2013.01); *A47C 3/04* (2013.01); *A47C 7/622* (2018.08); *A47C 1/16* (2013.01); *B64D 11/06* (2013.01)

(58) Field of Classification Search
CPC ........... B64D 11/06; A47C 1/16; A47C 1/124; A47C 11/02; A47C 11/005; A47C 7/624; A47C 3/04
See application file for complete search history.

(56) References Cited

U.S. PATENT DOCUMENTS

| | | | | |
|---|---|---|---|---|
| 2,518,532 | A * | 8/1950 | Edwards ................ | A47C 11/02 297/188.04 |
| 4,341,419 | A * | 7/1982 | Sebel ..................... | A47C 1/124 297/DIG. 2 |
| 7,401,854 | B2 | 7/2008 | Adams | |
| D607,223 | S | 1/2010 | Adams et al. | |
| 8,231,173 | B2 | 7/2012 | Miyazaki et al. | |
| 8,333,430 | B2 | 12/2012 | Adams et al. | |
| D677,069 | S | 3/2013 | Adams et al. | |

(Continued)

FOREIGN PATENT DOCUMENTS

| | | |
|---|---|---|
| DM | 215254 | 7/2021 |
| DM | 216317 | 9/2021 |

(Continued)

*Primary Examiner* — Syed A Islam
(74) *Attorney, Agent, or Firm* — Jacob M. Ward; Ward Law Office LLC

(57) ABSTRACT

A bench system is provided. The bench can include a seat with an opening, a plurality of rear legs and a console door. The plurality of rear legs can include a first leg, a second leg, and a third leg. The third leg can be disposed between the first leg and the second leg and have a hollow interior. The console door can be disposed adjacent to the hollow interior of the third leg and the opening of the seat. The console door can also be movable between an open position and a closed position. The bench system can include a first bench and second bench in a stacked arrangement. A method for stacking benches is also provided.

18 Claims, 12 Drawing Sheets

(56) References Cited

U.S. PATENT DOCUMENTS

| | | |
|---|---|---|
| 8,857,914 B2 | 10/2014 | Adams et al. |
| D717,058 S | 11/2014 | Prokofiev et al. |
| D733,449 S | 7/2015 | Adams et al. |
| D739,152 S | 9/2015 | Adams et al. |
| 9,144,309 B2 | 9/2015 | Adams et al. |
| 9,289,069 B2 | 3/2016 | Adams et al. |
| 9,504,329 B2 | 11/2016 | Adams et al. |
| 9,532,654 B1 | 1/2017 | Adams et al. |
| D778,081 S | 2/2017 | Prokofiev |
| D787,848 S | 5/2017 | Adams et al. |
| 9,675,176 B2 | 6/2017 | Adams et al. |
| D805,855 S | 12/2017 | Adams et al. |
| 10,016,058 B2 | 7/2018 | Adams et al. |
| D838,115 S | 1/2019 | Adams |
| D847,584 S | 5/2019 | Goodworth |
| D853,142 S | 7/2019 | Tao |
| D892,567 S | 8/2020 | Snir et al. |
| 11,064,810 B2 | 7/2021 | Snir et al. |
| D935,255 S | 11/2021 | Snir et al. |
| 2015/0223609 A1 | 8/2015 | Prokofiev et al. |
| 2019/0357688 A1 | 11/2019 | Dobson |
| 2021/0007495 A1 | 1/2021 | Snir et al. |
| 2021/0345779 A1 | 11/2021 | Truong et al. |

FOREIGN PATENT DOCUMENTS

| | | |
|---|---|---|
| IL | 67218 S1 | 7/2021 |
| IL | 67219 S1 | 7/2021 |
| IL | 67220 S1 | 7/2021 |

\* cited by examiner

BENCH SYSTEM AND METHOD

CROSS-REFERENCE TO RELATED APPLICATIONS

This application is a continuation-in-part of U.S. patent application Ser. No. 18/070,920, filed on Nov. 29, 2022, which in turn claims the benefit of U.S. Provisional Application No. 63/284,367, filed on Nov. 30, 2021. The entire disclosures of the above applications are incorporated herein by reference.

FIELD

The present technology relates to benches for sitting and, more particularly, to outdoor benches.

INTRODUCTION

This section provides background information related to the present disclosure which is not necessarily prior art.

Adirondack-style chairs are a larger type of chair and are very popular. For many years, these chairs were made of wood with the pieces of the chair nailed, glued, bolted, or screwed together to form a single unit. The Adirondack chair style typically has a straight back formed by multiple wooden planks that extend from a seat at an angle. Most wooden Adirondack-style chairs are not foldable. They are heavy and also very difficult to stack.

More recently, some Adirondack-style chairs have been made of plastic. These chairs are molded to look like the wooden Adirondack chairs. Such molded plastic chairs are lighter and may be more weather resistant than their wooden predecessors. Further, the molded plastic chairs may be stored more efficiently since the molded plastic chairs may often be stacked on top of one another.

Accordingly, there is a continuing need for molded plastic Adirondack-style chairs or benches that can accommodate more than one person. Desirably, such benches can be efficiently stacked and stored for shipping and sale onsite at stores.

SUMMARY

In concordance with the instant disclosure, a bench system and method that can accommodate more than one person, and which can be efficiently stacked and stored for shipping and sale onsite at stores, has surprisingly been discovered.

In certain embodiments, a bench is provided that can include a seat including a first end, a second end, a first rear corner area, and a second rear corner area, and a plurality of rear legs depending from the seat. The plurality of rear legs can include a first leg, a second leg, and a third leg, the third leg disposed between the first leg and the second leg, and an upper end of the third leg is in a forward position as compared to the first leg and the second leg.

In certain embodiments, a bench is provided that can include a seat with an opening and a plurality of rear legs depending from the seat. The plurality of rear legs can include a first leg, a second leg, and a third leg. The third leg can be disposed between the first leg and the second leg, the third leg being in a forward position as compared to the first leg and the second leg, and the third leg can have a hollow interior in communication with the opening. In this way, the opening can be configured to receive a third leg of another bench for the outdoors therethrough when the another bench is stacked on the bench, which allows the third leg of the another bench to pass through the opening of the bench and into the hollow interior of the third leg of the bench. The bench can include a console door disposed adjacent to the opening of the seat. The console door can also be movable between an open position and a closed position.

In certain embodiments, a bench system is provided that can include a first bench and a second bench. The first bench can include a seat with an opening, a plurality of rear legs depending from the seat, and a console door. The plurality of rear legs can include a first leg, a second leg, and a third leg. The third leg can be disposed between the first leg and the second leg, can be in a forward position as compared to the first leg and the second leg, and can have a hollow interior. The console door can be disposed adjacent to the hollow interior of the third leg and the opening of the seat. The console door can also be movable between an open position and a closed position. The second bench a seat with an opening, a plurality of rear legs and a console door. The plurality of rear legs can include a first leg, a second leg, and a third leg. The third leg can be disposed between the first leg and the second leg and have a hollow interior. The console door can be disposed adjacent to the hollow interior of the third leg and the opening of the seat. The console door can also be movable between an open position and a closed position. The second bench can be stacked atop the first bench in a stacked arrangement and the console door of the first bench is in the opened position, and the central rear leg of the second bench is disposed within the hollow interior of the central rear leg of the first bench.

In certain embodiments, a method for stacking a bench system is provided where the method can include providing a first bench and a second bench. A console door of the first bench can be moved into an open position. A third leg of the second bench can be placed through an opening of a seat of the first bench and into a hollow interior of the third leg of the first bench.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
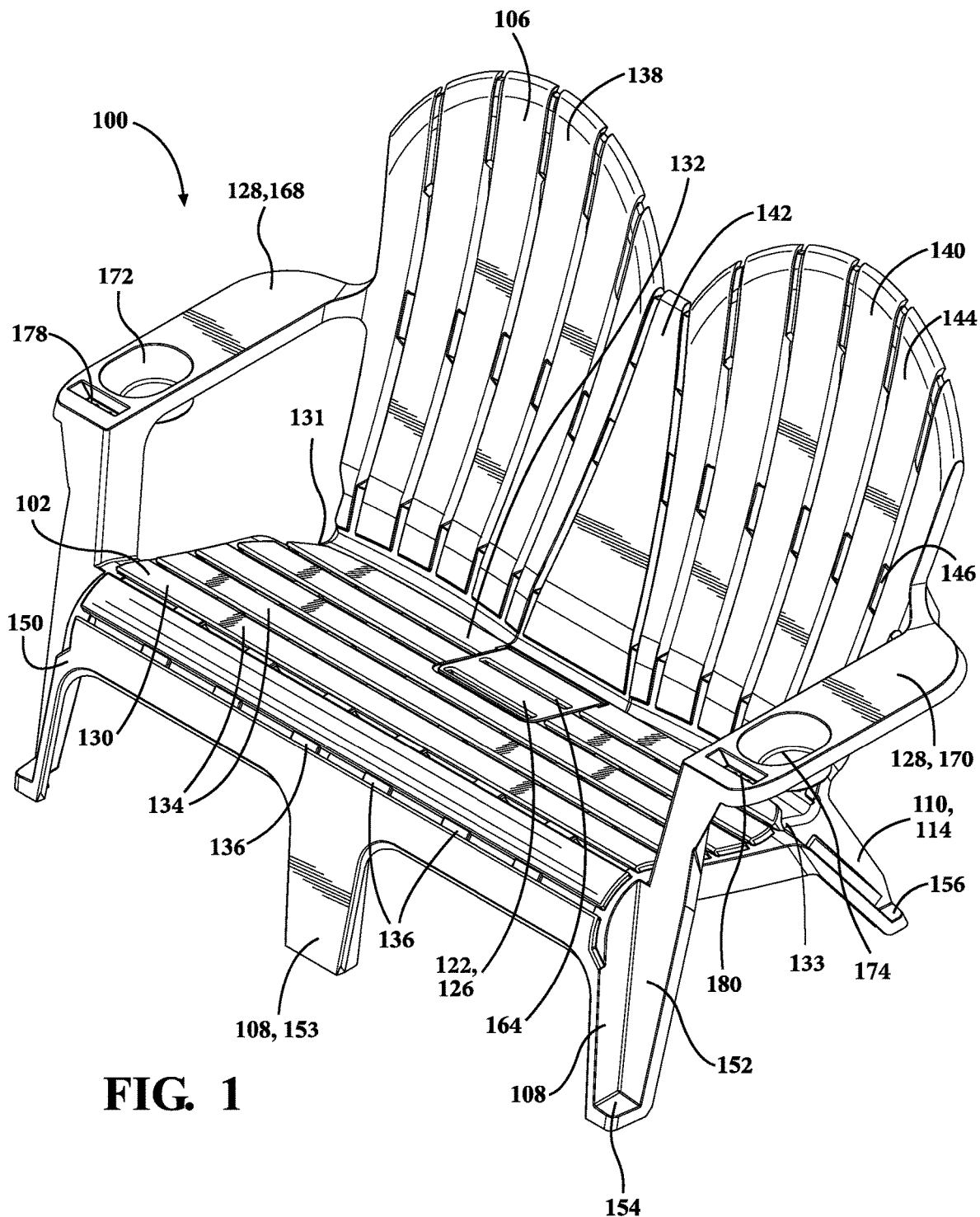
FIG. 1 is a front top perspective view of a bench in a closed position according to the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a bench 100, a bench system 200, and a method 300 for stacking a bench system 200, aspects of which are shown generally in FIGS. 1-11. The bench 100 can be configured for ease of transport including features positioned to optimize ease of use. Aspects of the bench 100 further facilitate the storage of the bench 100 and stacking thereof in a bench system 200 such that a first bench 100 can be configured to receive a second bench 100' in a stacked arrangement. The first bench 100 can include a seat 102 including an opening 104, a backrest 106, a plurality of front legs 108, a plurality of rear legs 110 including a first leg 112, a second leg 114, and a third leg 116 with a hollow interior 120 disposed between the first leg 112 and the second leg 114 and in communication with the opening, a console door 122 movable between an open position 124 and a closed position 126, and a pair of armrests 128. The second bench 100' can include a seat 102' including an opening 104', a backrest 106', a plurality of front legs 108', a plurality of rear legs 110' including a first leg 112', a second leg 114', and a third leg 116' with a hollow interior 118' disposed between the first leg 112' and the second leg 114', a console door 122' movable between an open position 124' and a closed position 126', and a pair of armrests 128'.

As shown in FIG. 1, the seat 102 can include a first end 130 and a second end 132, wherein the second end 132 includes a first corner area 131 and a second corner area 133. The first end 130 of the seat 102 can be ergonomically shaped to allow for a comfortable seating experience by a user. In the stacked arrangement, the underside of the seat 102' of the second bench 100' can abut the topside of the seat 102 of the first bench 100. The opening 104 can be disposed adjacent to the second end 132 of the seat 102 and configured to receive the third leg 116. Accordingly, the opening can be configured to receive a third leg of another bench for the outdoors therethrough when the another bench is stacked on the bench, which allows the third leg of the another bench to pass through the opening of the bench and into the hollow interior of the third leg of the bench. As a non-limiting example, the opening 104 can be substantially rectangular in shape and, more particularly, shaped such that the third leg 116' of a second bench 100' can be easily disposed through the opening 104. Further, and with reference to FIG. 2, the opening 104 can have a first width (W1). One of ordinary skill in the art can select a suitable size and shape for the opening 104 within the scope of the present disclosure.

With continued reference to FIG. 1, the seat 102 can include a plurality of horizontal slats 134. A brace 136 can be disposed between adjacent horizontal slats 134. In a specific example, the seat 102 can include a plurality of braces 136 between adjacent horizontal slats 134. The plurality of braces 136 can be distributed across the width of the seat 102. Desirably, the plurality of braces 136 can enhance the durability of the seat 102 by more evenly distributing pressure from normal use across a larger area of the seat 102. In a more specific example, the plurality of braces 136 can substantially align with the ischial tuberosities (not shown) of a pelvis of an average sized user. Where the plurality of braces 136 substantially aligns with the ischial tuberosities (not shown) of the average sized user, the area in the seat 102 receiving the most pressure can be most adequately supported while still minimizing the overall weight of the bench 100. In this way, the plurality of braces 136 can militate against the seat 102 fatiguing, cracking, or breaking. One of ordinary skill in the art can select a suitable pattern for the braces 136 to provide sufficient support within the scope of the present disclosure.

Figure 2:
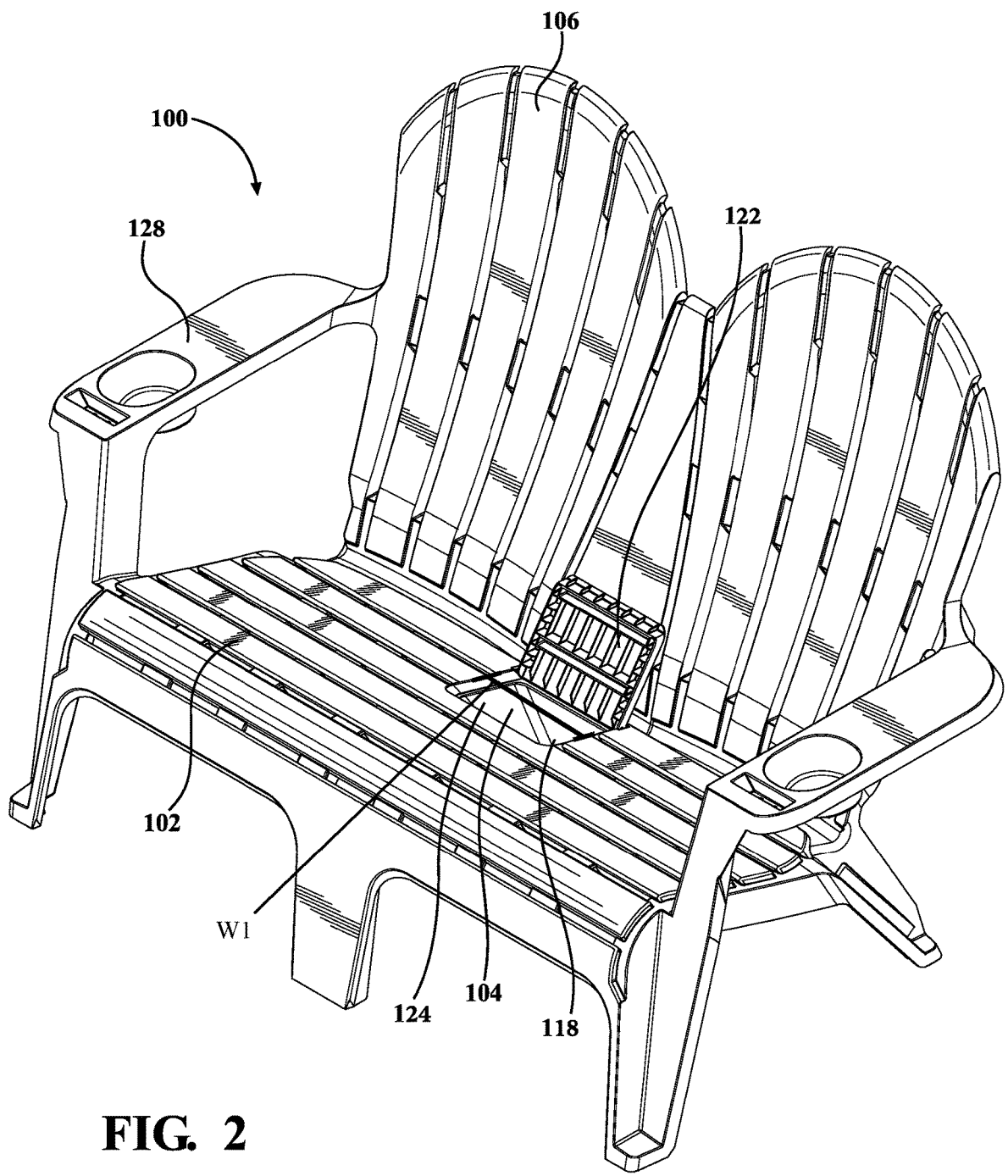
FIG. 2 is a front top perspective view of the bench in an open position thereof.
Figure 3:
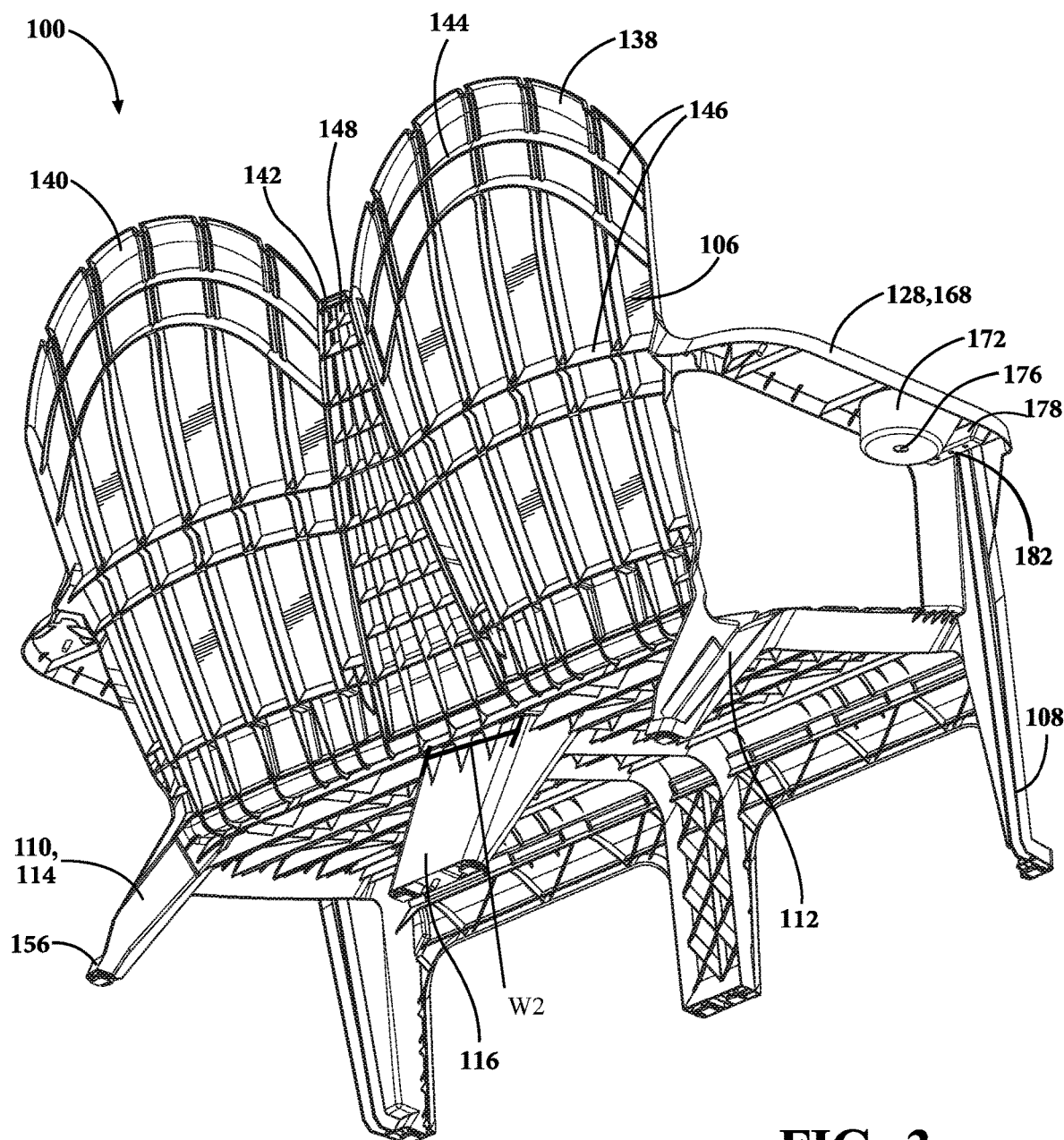
FIG. 3 is a bottom rear perspective view thereof.

As shown in FIGS. 1 and 3, the backrest 106 can include a first support 138, a second support 140, and a central support 142. The backrest 106 can be shaped to support the back of the user. As a non-limiting example, the backrest 106 can be arched. The first support 138 and the second support 140 can be disposed on opposite sides of the central support 142, as shown in FIGS. 1-3, and each of the first support 138 and the second support 140 can be arched. The first support 138 and the second support 140 can include a plurality of vertical slats 144. A support ridge 146 can be disposed horizontally on a rear side of the first support 138 and a rear side of the second support 140. In another non-limiting example, the support ridge 146 can be curved such that the curvature of the support ridge 146 is substantially the same as the curvature of a top portion of the backrest 106. Advantageously, the support ridge 146 can enhance the durability of the backrest 106 by more evenly distributing pressure from normal use across a larger area of the backrest 106. In this way, the support ridges 146 can militate against the backrest 106 fatiguing, cracking, or breaking. One of ordinary skill in the art can select a suitable number and pattern for the support ridge 146 to provide sufficient support within the scope of the present disclosure.

With continued reference to FIG. 3, the central support 142 can include a plurality of support beams 148. The support beams 148 can be disposed in a grid pattern having multiple intersecting lines. Advantageously, the support beams 148 can enhance the durability of the backrest 106 by more evenly distributing pressure from normal use across a larger area of the backrest 106. In this way, the support beams 148 can militate against the backrest 106 fatiguing, cracking, or breaking. One of ordinary skill in the art can select a suitable pattern for the support beams 148 to provide sufficient support within the scope of the present disclosure.

As shown in FIGS. 1-2, the plurality of front legs 108 can be disposed adjacent to the seat 102. The plurality of front legs 108 can include a front left leg 150, a front right leg 152, and a front central leg 153. Each of the front left leg 150 and the front right leg 152 can have a foot 154 extending outwardly from the leg. Advantageously, the foot 154 can create a more stable resting surface for the bench 100 and therefore can increase durability. One of ordinary skill in the art can select a suitable size for the foot 154 within the scope of the present disclosure.

As shown in FIG. 3, the plurality of rear legs 110 can include the first leg 112, the second leg 114, and the third leg 116. The third leg 116 can be disposed between the first leg 112 and the second leg 114. The third leg 116 can include the hollow interior 118. Each of the first leg 112 and the second leg 114 can have a foot 156 extending outwardly from the leg. Advantageously, the foot 156 can create a more stable resting surface for the bench 100 and therefore can increase durability. One of ordinary skill in the art can select a suitable size for the foot 156 within the scope of the present disclosure.

Figure 12:
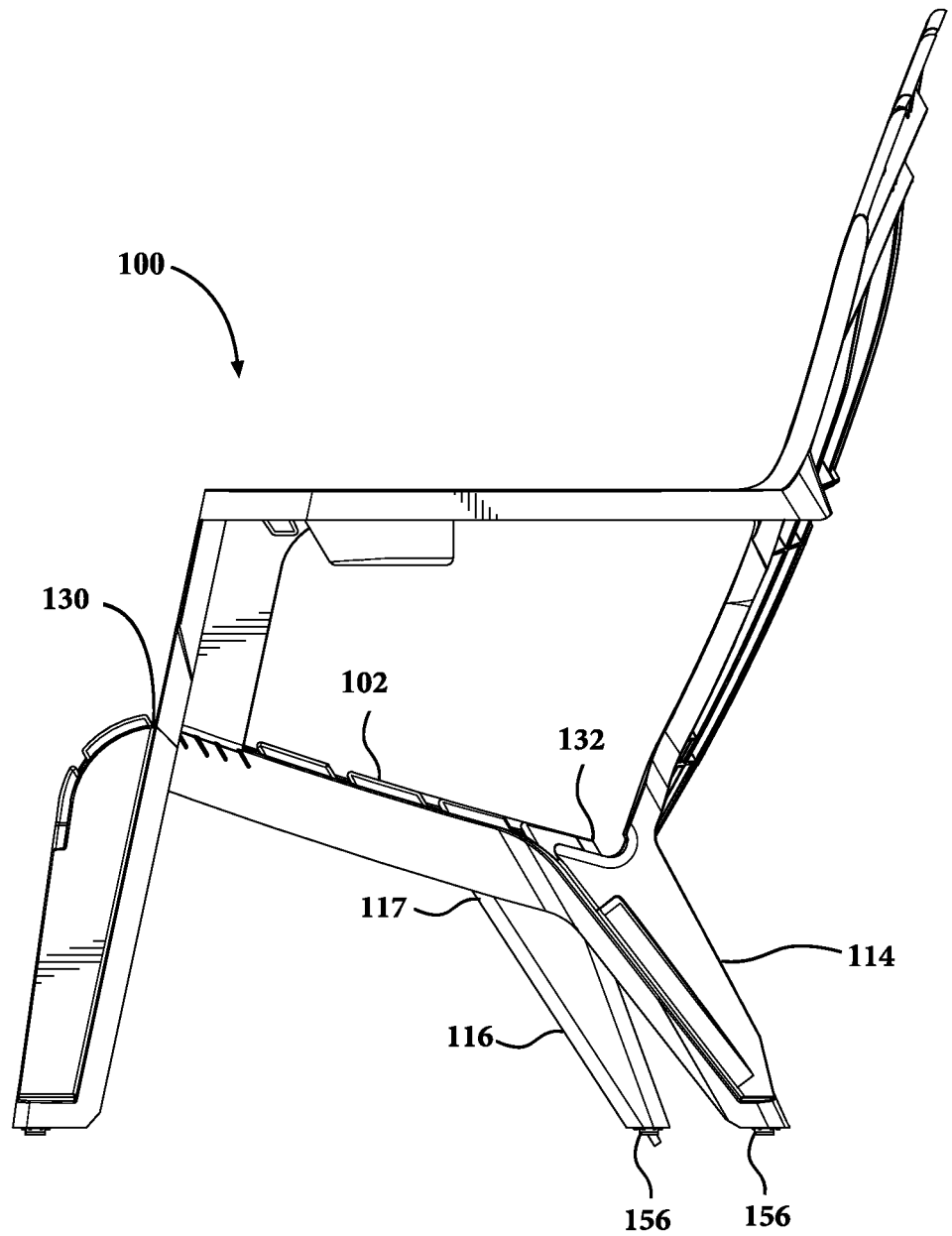
FIG. 12 is a side elevation view of the bench of FIG. 1.

As more clearly shown in FIG. 12, the third leg 116 can be inset or in a forward position with respect to the first leg 112 and the second leg 114, wherein the third leg 116 is disposed underneath the seat 102 adjacent the second end 132 of the seat 102. In this way, an upper end 117 of the third leg 116 is positioned closer to the first end 130 than upper ends of the first leg 112 and the second leg 114. The forward position includes where the third leg 116 is in an intermediate position relative to a distance between the front legs 108 and the rear legs 110. The forward position of the third leg 116 results in the third leg 116 being the first of the rear legs 110 to bear the pressure applied from the user or users sitting on the seat 102, as well as the third leg 116 bearing a greater portion of the total pressure applied from the user or users siting on the seat 102 as compared to the first leg 112 and the second leg 114. It has also been found that the forward position of the third leg 116 facilitates the stabilization of the bench 100 when, for example, the bench 100 is placed on an uneven or un-level surface, or when the pressure applied to the seat 102 is not evenly distributed due to the location of the user or users sitting on the seat 102 or a difference in the weights of the users sitting on the seat 102.

With continued reference to FIGS. 2 and 6-10, the third leg 116 can have the hollow interior 118. The hollow interior 118 of the first bench 100 can be configured to receive the third leg 116 of the second bench 100' in a stacked arrangement. In the stacked arrangement, the third leg 116 of the second bench 100' can abut the hollow interior 118 of the third leg 116 of the first bench 100. Further, in the stacked arrangement, the front left legs 150, 150', the front right legs 152, 152', the first legs 112, 112', and the second legs 114, 114' can abut one another, respectively. The hollow interior 118 can include a first end 158 and a second end 160. The hollow interior 118 can be angled and can have a substantially rectangular cuboid shape that tapers from the first end 158 to the second end 160 with both the depth and the width decreasing. The first end 158 can have a first depth (D1) and a second width (W2) and the second end 160 can have a second depth (D2). The first depth (D1) can be greater than the second depth (D2), as shown in FIG. 7A. Additionally, the first width (W1) of the opening 104 can be substantially the same as the second width (W2) of the third leg 116.

As shown in FIGS. 7-10, the console door 122 can be disposed adjacent to the hollow interior 118 of the third leg 116 and the opening 104 of the seat 102. The console door 122 can be movable between the open position 124 and the closed position 126. In the open position 124, the console door 122 can allow for the hollow interior 118 of the third leg 116 of the first bench 100 to receive the third leg 116 of the second bench 100'. Likewise, the console door 122 can have a third width (W3), shown in FIG. 4, that is substantially the same as the first width (W1) of the opening 104. Similarly, the third width (W3) of the console door 122 and the second width (W2) of the third leg 116 can be substantially the same. In the closed position 126, access to the hollow interior 118 of the third leg 116 can be shut off. Advantageously, this can allow the user to sit on a smooth, uninterrupted surface to provide additional comfort. Desirably, the console door 122 being in the closed position 126 can militate against the user's belongings from falling into the hollow interior 118 and, further, from debris such as leaves, from entering the hollow interior 118 when the bench 100 is not in use or in the stacked arrangement.

With reference to FIG. 7A, the console door 122 can be shaped substantially similar to the shape of the opening 104. As a non-limiting example, the console door 122 can be substantially rectangular. One of ordinary skill in the art can select a suitable shape for the console door 122 within the scope of the present disclosure. Additionally, the console door 122 can include support posts 162. As a non-limiting example, the support posts 162 can be in a grid pattern with having multiple intersecting lines. Advantageously, the support posts 162 can provide the console door 122 with additional structural support and durability of the console door 122.

With continued reference to FIG. 7-10, the console door 122 can include a slot 164 configured to allow air to flow through the console door 122. The slot 164 can be disposed parallel with the backrest 106 of the bench 100. The slot 164 can be disposed in alignment with empty space created between the plurality of horizontal slats 134 that run across the seat 102 of the bench 100. Advantageously, the slot 164 can allow for wind to pass through the console door 122 while in the open position 124 and militate against the console door 122 being closed by the wind while the user is placing the first bench 100 and the second bench 100' in the stacked arrangement. Desirably, this feature can prolong the lifespan of the console door 122 and militate against the console door 122 of the first bench 100 and/or the third leg 116' of the second bench 100' from breaking or cracking if the console door 122 and third leg 116 would come into the contact when the user was placing the first bench 100 and the second bench 100' in the stacked arrangement.

Figure 7:
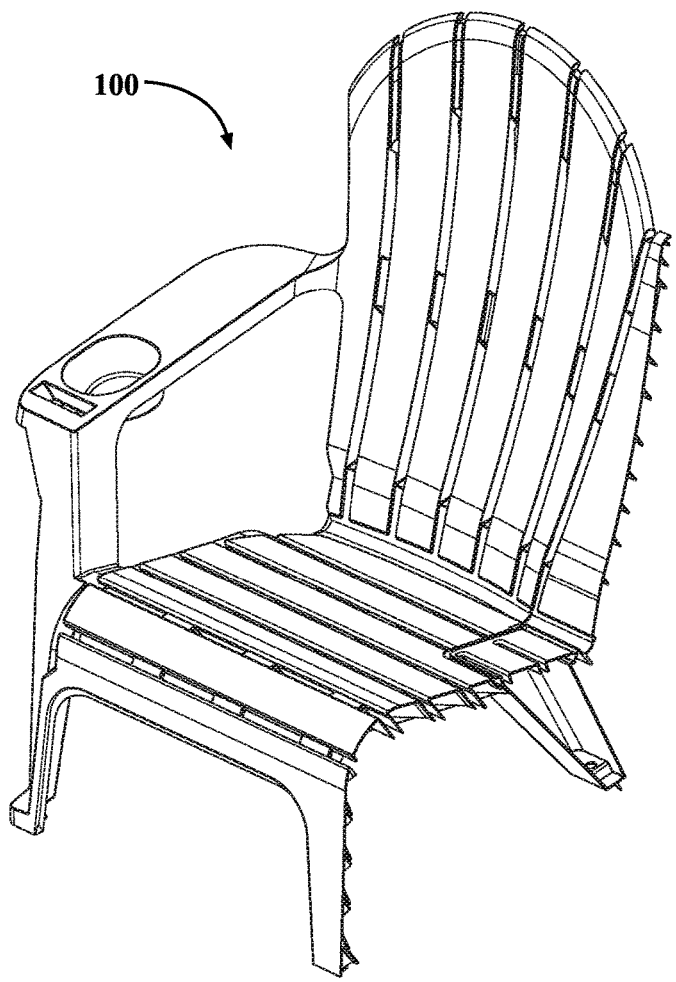
FIG. 7 is a front top perspective cross sectional view of the bench.
Figure 7A:
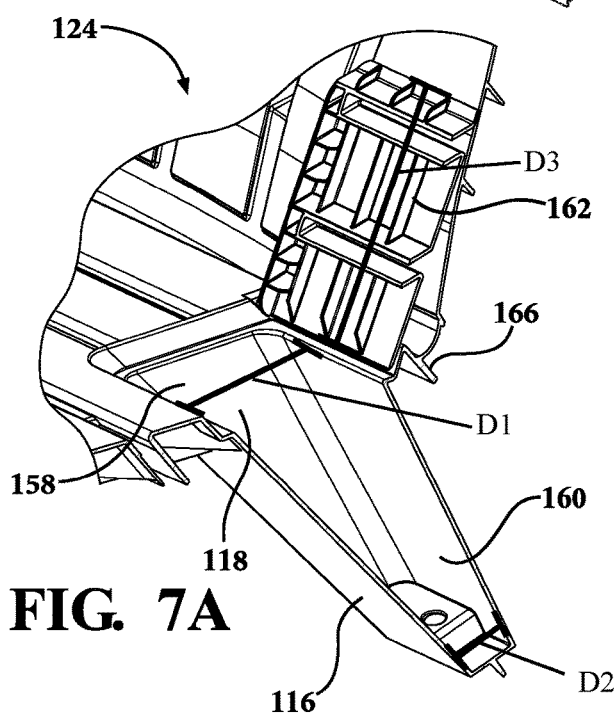
FIG. 7A is a front top perspective cross sectional view of the bench in the open position.
Figure 7B:
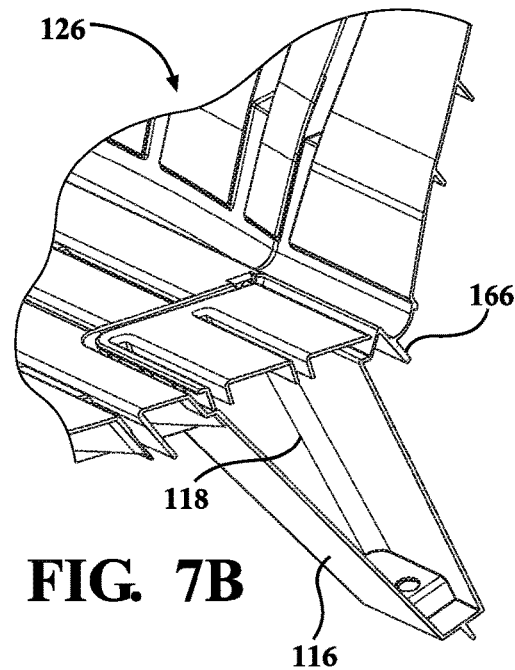
FIG. 7B is a front top perspective cross sectional view of the bench in the closed position.
Figure 8:
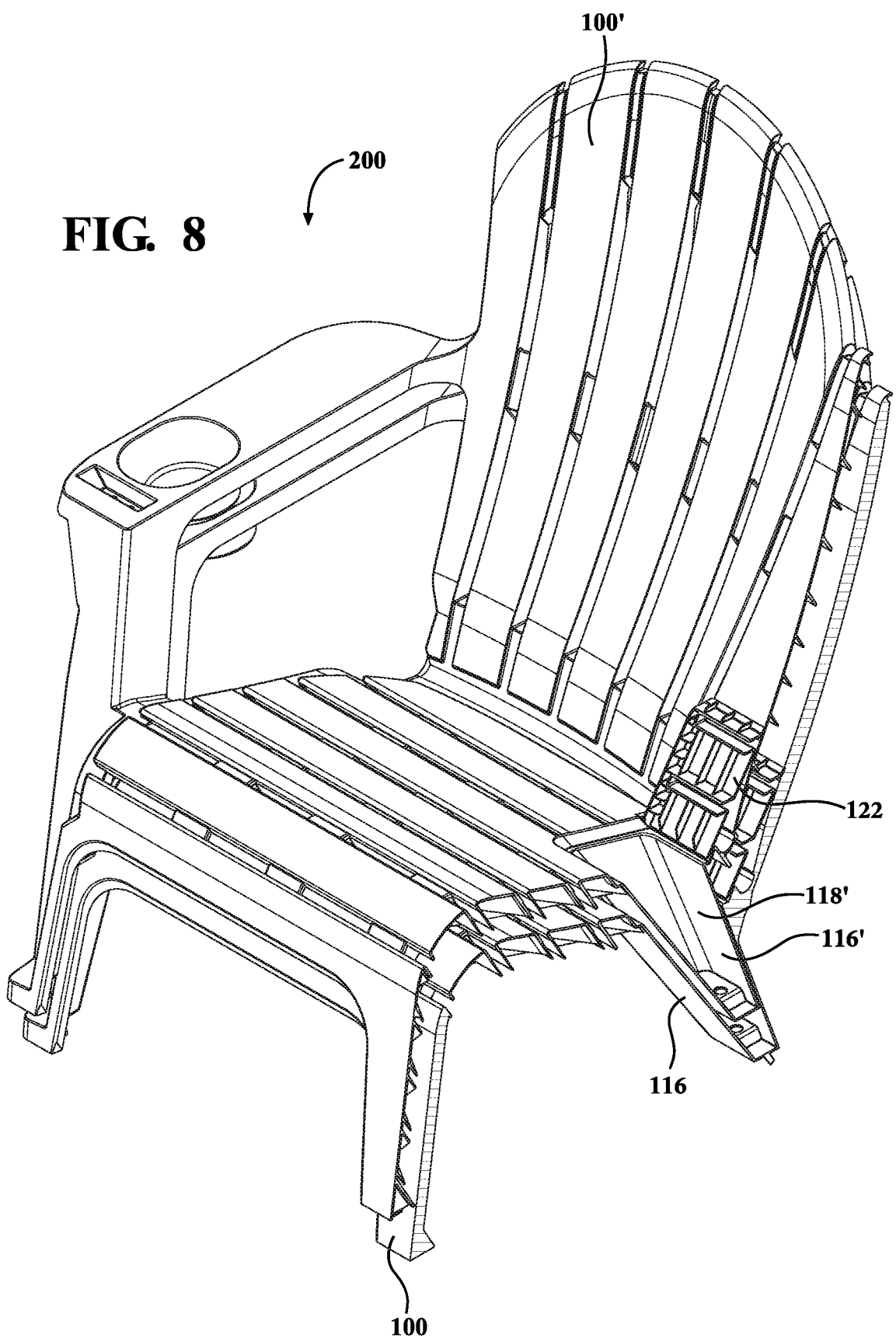
FIG. 8 is a front top perspective cross sectional view of the bench system.
Figure 9:
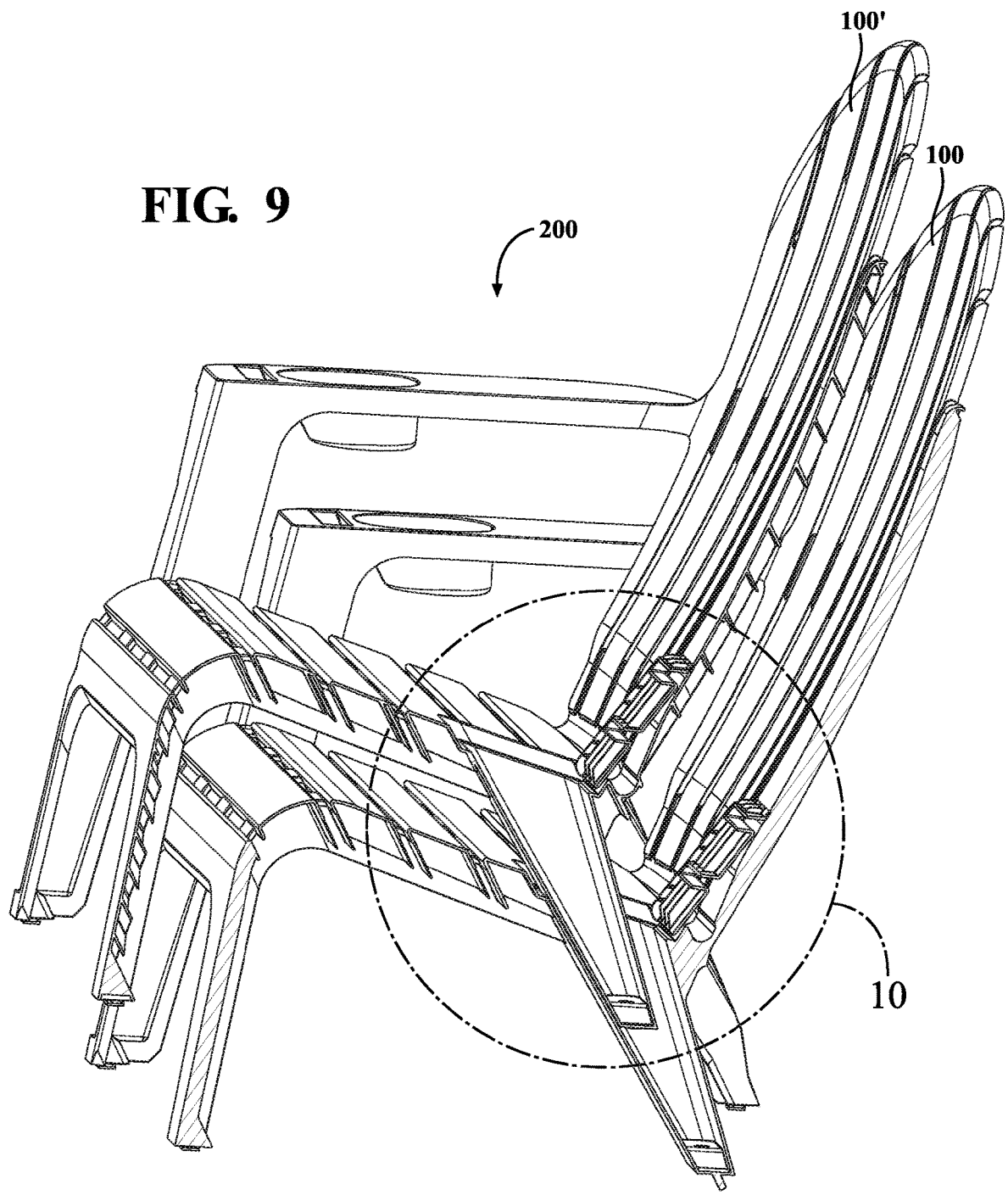
FIG. 9 is a right side elevational cross sectional view of thereof.
Figure 10:
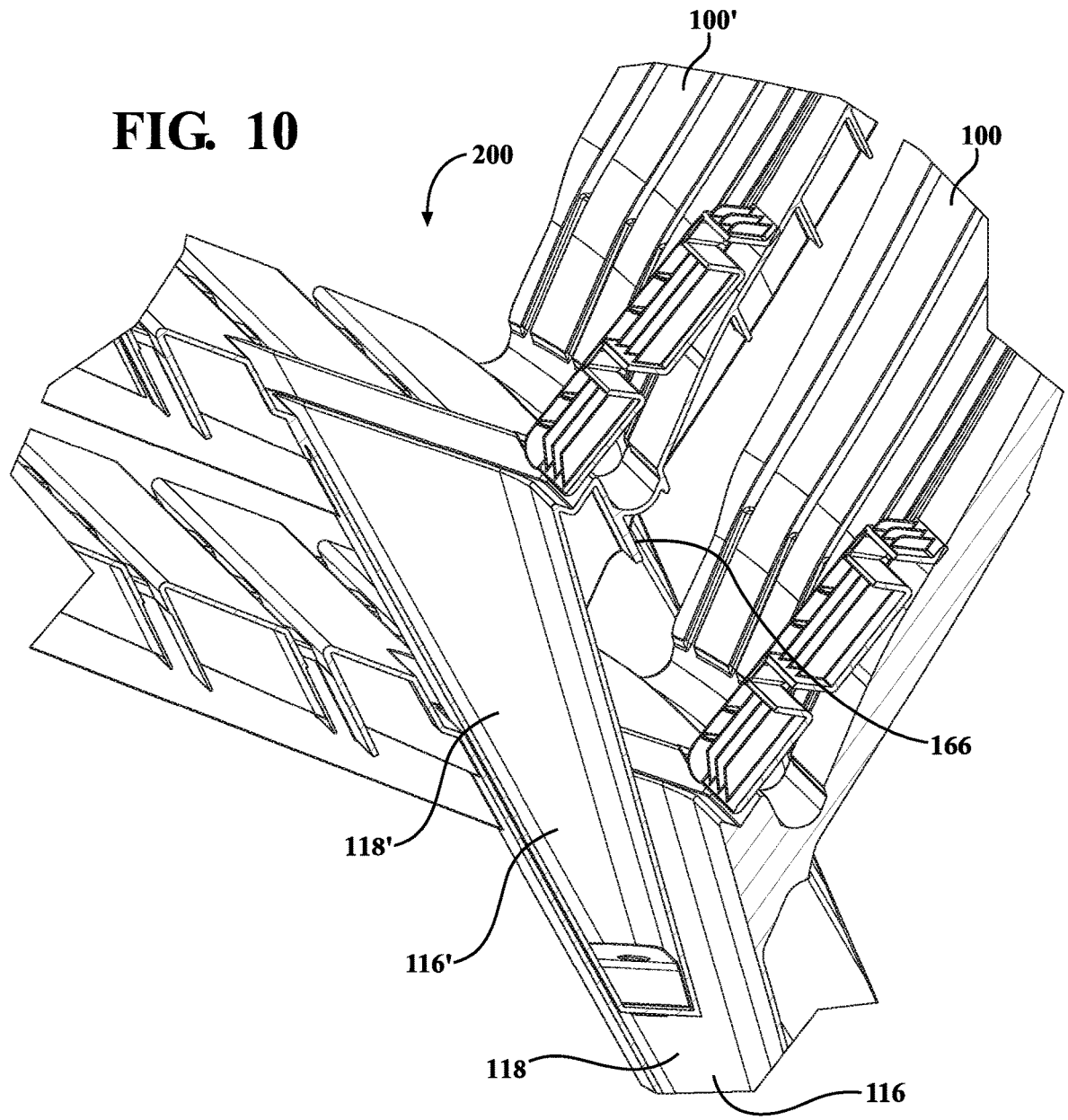
FIG. 10 is a call out of FIG. 9 further depicting the bench system.

As shown in FIGS. 7A-7B and 10, the backrest 106 can include a protrusion 166 disposed on the rear of the backrest 106. The protrusion 166 of the second bench 100' can be configured to be disposed adjacent to the slot 164 of the console door 122 of the first bench 100 when the console door is in the open position and the first bench 100 and the second bench 100' are in the stacked arrangement. Desirably, the protrusion 166 can militate against the third leg 116 of the second bench 100' from sitting too deeply within the hollow interior 118 of the third leg 116 of the first bench 100 and becoming stuck. As such, the protrusion 166 can militate against the third leg 116 of the first bench 100 and the second bench 100' from breaking and increase the longevity of the bench 100. Further, the protrusion 166 can allow for a uniform stack of the first bench 100, the second bench 100', and any subsequent bench and provide more stability for storage and transportation.

Figure 4:
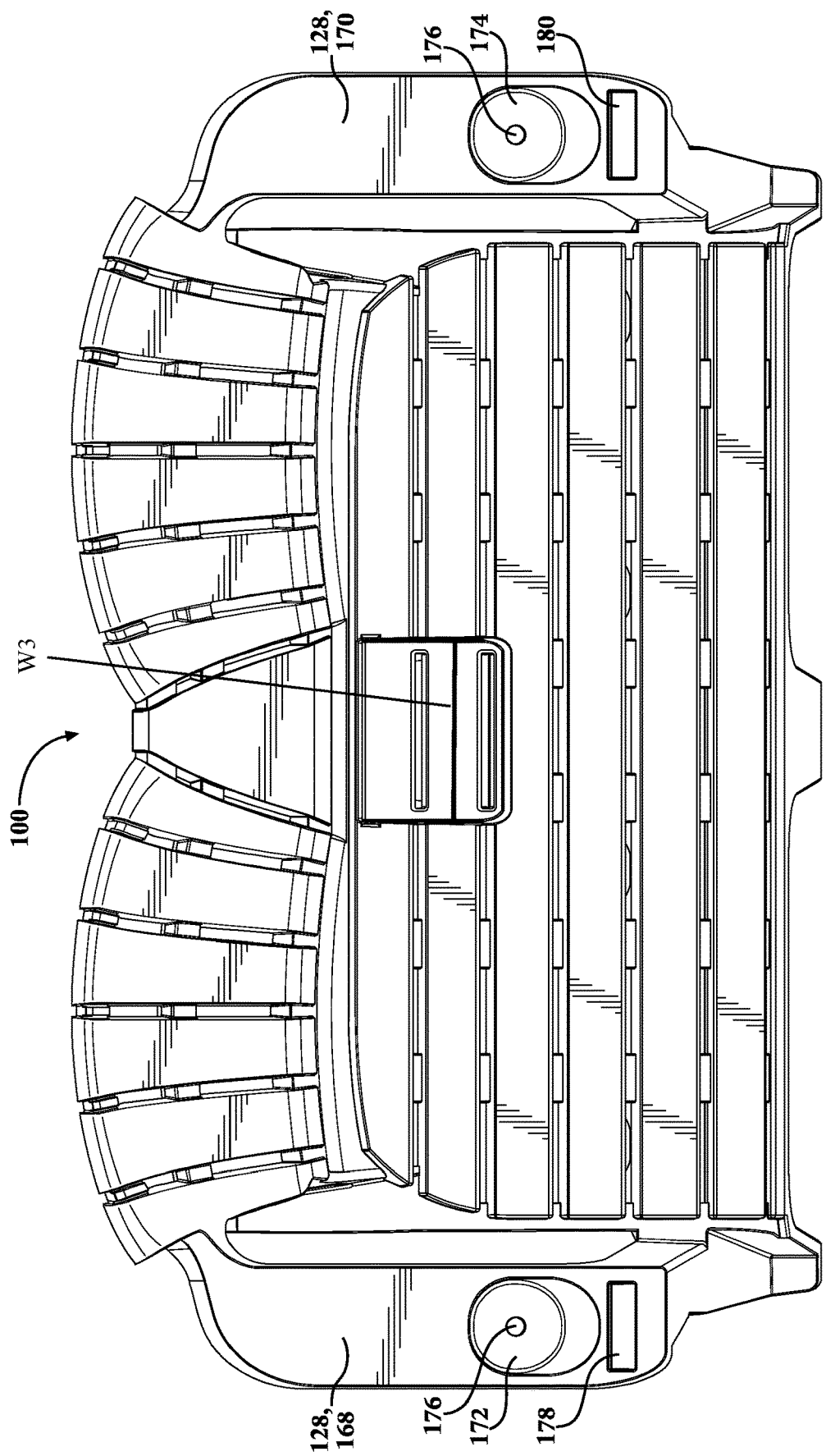
FIG. 4 is a top plan view thereof.
Figure 5:
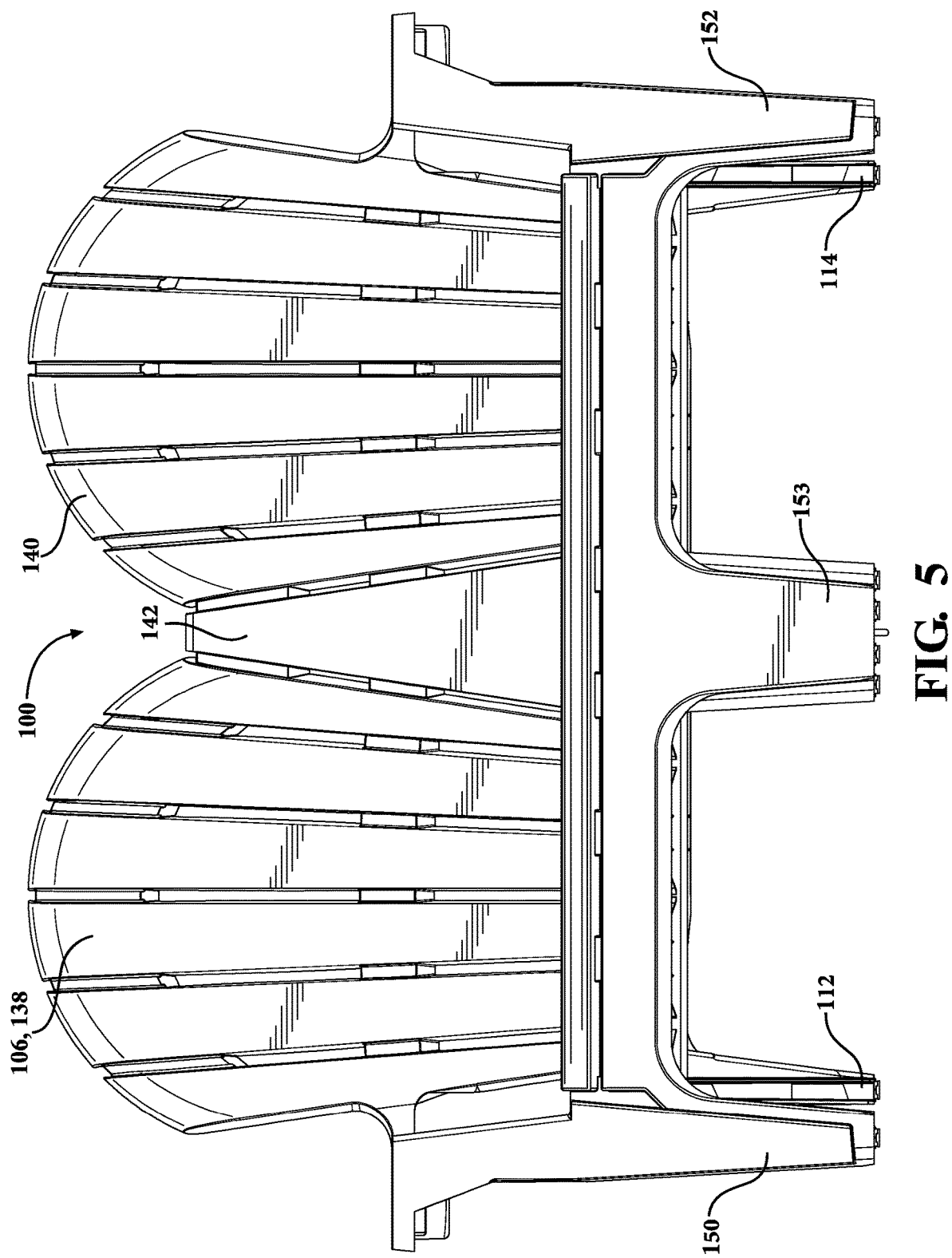
FIG. 5 is a rear elevational view thereof.

As shown in FIGS. 1 and 3-4, the pair of armrests 128 can include a first armrest 168 and a second armrest 170. The pair of armrests 128 can be coupled to the plurality of front legs 108 and the backrest 106. The pair of armrests 128 can be disposed substantially parallel with a surface that the bench 100 can sit upon. Advantageously, this can provide the user with a place to rest their arms while using the bench 100. Accordingly, the armrests 128 can provide structural support to the bench 100 and militate against the backrest 106 torquing while in use, in storage, or in transport.

Figure 6:
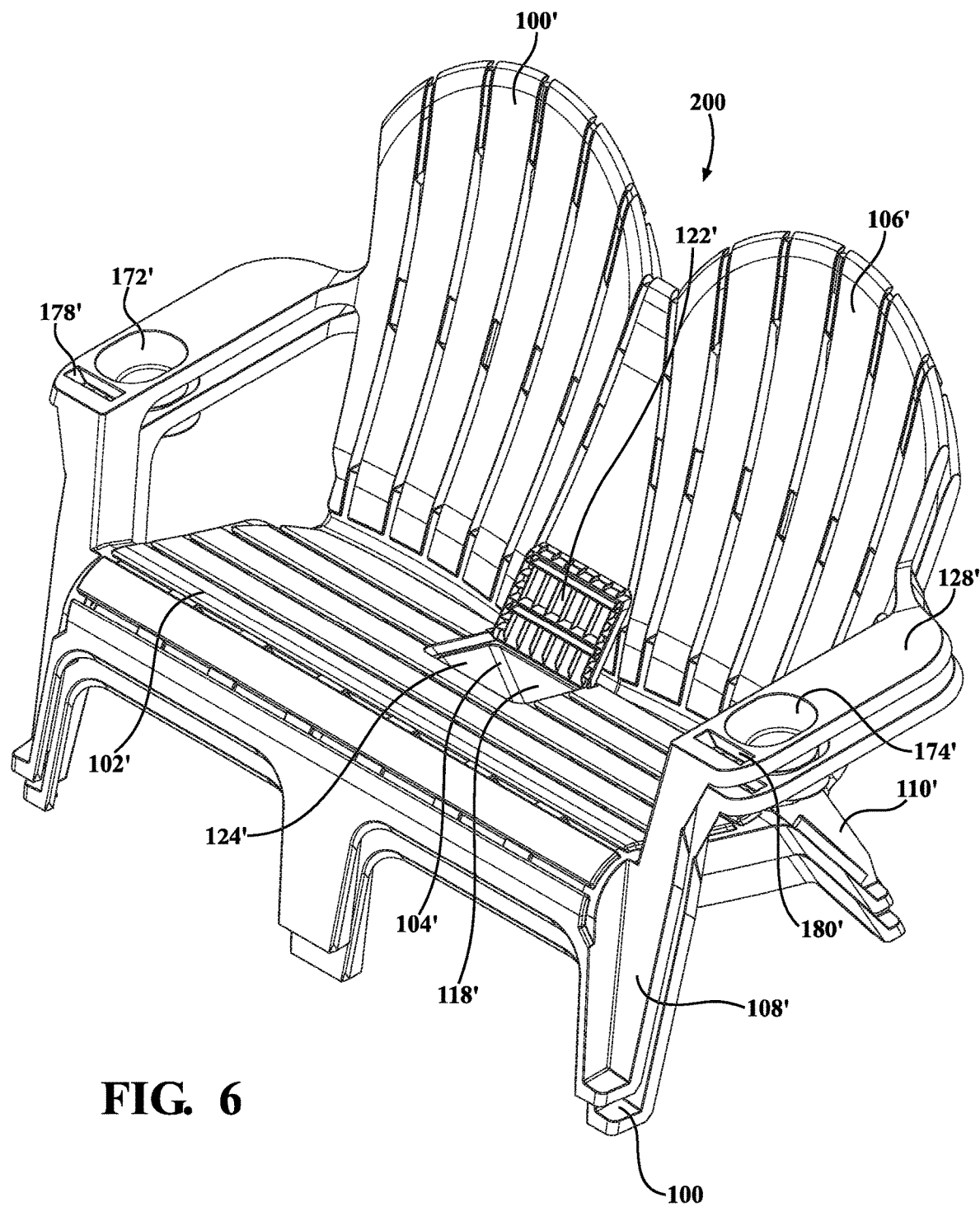
FIG. 6 is a front top perspective view of a bench system according to the present disclosure.

In a particular embodiment, and with continued reference to FIGS. 3 and 6, the first armrest 168 can include a first recess 172 and the second armrest 170 can include a second recess 174. The first recess 172 and the second recess 174 can both be substantially oval in shape and configured to receive a beverage container. Wherein the first bench 100 and second bench 100' are in the stacked arrangement, the first recess 172 of the first bench 100 can be configured to receive the first recess 172' of the second bench 100' and the second recess 174 of the first bench 100 can be configured to receive the second recess 174' of the second bench 100'. Advantageously, this can allow for the benches 100,100' to be stable while in the stacked arrangement. One of ordinary skill in the art can select a suitable shape for the first recess 172 and the second recess 174 within the scope of the present disclosure.

The first recess 172 and the second recess 174 can include a drainage hole 176 configured to allow for liquid to exit the recess and militate against liquid pooling within the recess 172, 174. Advantageously, this feature can militate against the surface of the bench 100 from absorbing the liquid and causing a break in the chemical chain of the surface and resulting in possible cracking of the recess 172, 174.

In another embodiment, and with reference to FIG. 6, the first armrest 168 can include a first aperture 178 and the second armrest 170 can include a second aperture 180. The first aperture 178 and the second aperture 180 can both be substantially rectangular in shape and configured to receive a mobile device, such as a smartphone. Wherein the first bench 100 and second bench 100' are in the stacked arrangement, the first aperture 178 of the first bench 100 can be configured to receive the first aperture 178' of the second bench 100' and the second aperture 180 of the first bench 100 can be configured to receive the second aperture 180' of the second bench 100'. Advantageously, this can allow for the benches 100, 100' to be stable while in the stacked arrangement. One of ordinary skill in the art can select a suitable shape for the first aperture 178 and the second aperture 180 within the scope of the present disclosure.

The first aperture 178 and the second aperture 180 can include a drainage hole 182 configured to allow for liquid to exit the aperture 178, 180 and militate against liquid pooling within the aperture 178, 180. Advantageously, this feature can militate against the surface of the bench 100 absorbing the liquid and causing a break in the chemical chain of the surface and resulting in possible cracking of the aperture 178, 180. As a non-limiting example, the first aperture 178 and the second aperture 180 can include a plurality of drainage holes 182 spaced evenly in the aperture. Desirably, the plurality of drainage holes 182 can allow for any heat dispelled by the mobile device to exit the aperture 178,180 and militate against the heat causing any damage to the aperture 178, 180, such as melting the aperture 178,180.

The bench 100 can be formed from a solid material. The solid material can allow for the bench 100 to be stable and durable as it is weathered from the outdoors and transported or stored in the stacked arrangement. As non-limiting examples, the bench 100 can be formed from various polyolefins and mixtures thereof, polypropylene, high density polyethylene (HDPE), and/or polyethylene terephthalate (PET). One of ordinary skill in the art can select other suitable materials for forming the bench 100 within the scope of the present disclosure.

Figure 11:
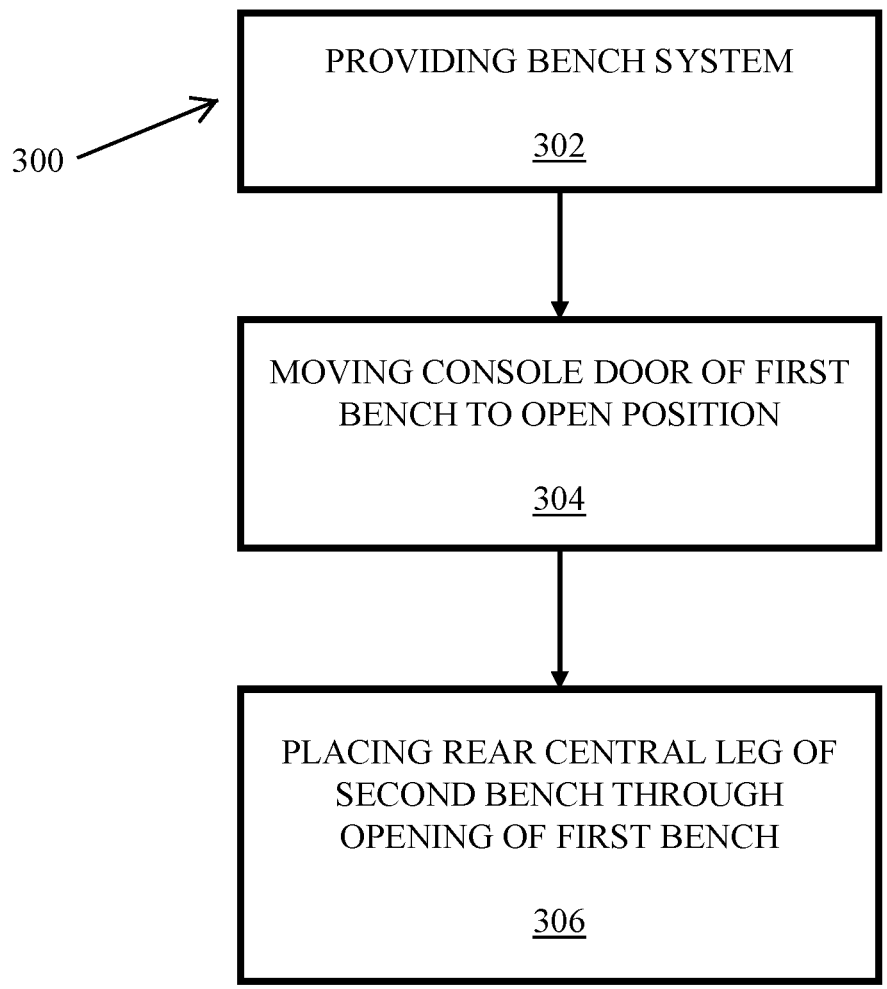
FIG. 11 is a flow diagram of a method for stacking a bench system.

The present disclosure further contemplates a method 300 for stacking a bench system 200, shown in FIG. 11. In a step 302, a bench system 200 as described hereinabove, including a first bench 100 and a second bench 100', is provided. The first bench 100 can include a seat 102 including an opening 104, a backrest 106, a plurality of front legs 108, a plurality of rear legs 110 including a first leg 112, a second leg 114, and a third leg 116 with a hollow interior 120 disposed between the first leg 112 and the second leg 114, a console door 122 movable between an open position 124 and a closed position 126, and a pair of armrests 128. The second bench 100' can include a seat 102' including an opening 104', a backrest 106', a plurality of front legs 108', a plurality of rear legs 110' including a first leg 112', a second leg 114', and a third leg 116' with a hollow interior 118' disposed between the first leg 112' and the second leg 114', a console door 122' movable between an open position 124' and a closed position 126', and a pair of armrests 128'.

In a step 304, the console door 122 of the first bench 100 can be moved into the open position 124 by lifting the console door 122 and exposing the hollow interior 118 of the third leg 116 of the first bench 100. In a step 306, the third leg 116' of the second bench 100' can be placed through the opening 104 of the seat 102 of the first bench 100 and into the hollow interior 118 of the third leg 116 of the first bench 100, wherein the first bench 100 and the second bench 100' are in a stacked arrangement. In a step 308, additional benches can be stacked in the stacked arrangement as desired.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A bench for the outdoors, comprising:
   a seat including an opening;
   a plurality of rear legs depending from the seat, the plurality of rear legs including a first leg, a second leg, and a third leg, the third leg disposed between the first leg and the second leg, the third leg being in a forward position as compared to the first leg and the second leg, and the third leg having a hollow interior in communication with the opening;
   wherein the opening is configured to receive a third leg of another bench for the outdoors therethrough when the another bench is stacked on the bench, the third leg of the another bench passing through the opening of the bench and into the hollow interior of the third leg of the bench.

2. The bench of claim 1, wherein seat includes a first end, a second end, a first rear corner area, and a second rear corner area, and at least a portion of an upper end of the third leg is positioned between the first end and the second end of the seat, an upper end of the first leg is adjacent the first rear corner area of the seat, and an upper end of the second leg is adjacent the second rear corner area of the seat.

3. The bench of claim 1, wherein the opening has a first width, the third leg has a second width, the first width and the second width being substantially the same.

4. The bench of claim 1, wherein the opening is substantially rectangular.

5. The bench of claim 1, wherein the third leg has a first depth and a second depth, the first depth being greater than the second depth.

6. The bench of claim 1, wherein a width and a depth of the third leg decease from a first end to a second end.

7. The bench of claim 1, further comprising a console door disposed adjacent to the opening of the seat, and movable between an open position and a closed position.

8. The bench of claim 7, wherein a second width of the third leg and a third width of the console door are substantially the same.

9. The bench of claim 7, wherein a first width of the opening and a third width of the console door are substantially the same.

10. The bench of claim 7, wherein the console door is substantially rectangular and includes ludes posts and a slot configured to allow air to flow through the console door.

11. The bench of claim 1, further including a backrest, a plurality of front legs disposed adjacent to the seat, and a pair of armrests including a first armrest and a second armrest coupled to the plurality of front legs and the backrest.

12. The bench of claim 11, wherein the first armrest and the second armrest include a first recess, a second recess, a first aperture, and a second aperture, the first recess and the second recess configured to hold a beverage container, the first aperture and the second aperture configured to hold a mobile device, and the first recess, the second recess, the first aperture, and the second aperture each have a drainage hole.

13. The bench of claim 11, wherein the backrest includes a first support and a second support, each of the first support and the second support being arched.

14. A bench system, comprising:
a first bench including
   a seat having an opening,
   a plurality of rear legs depending from the seat, the plurality of rear legs including a first leg, a second leg, and a third leg, the third leg disposed between the first leg and the second leg, the third leg being in a forward position as compared to the first leg and the second leg, the third leg having a hollow interior, and
   a console door disposed adjacent to the hollow interior of the third leg and the opening of the seat, the console door movable between an open position and a closed position; and
a second bench including
   a seat having an opening,
   a plurality of rear legs depending from the seat, the plurality of rear legs including a first leg, a second leg, and a third leg, the third leg disposed between the first leg and the second leg, the third leg being in a forward position as compared to the first leg and the second leg, the third leg having a hollow interior;
wherein second bench is stacked atop the first bench in a stacked arrangement and the console door of the first bench is in the opened position, and the third leg of the second bench is disposed within the hollow interior of the third leg of the first bench.

15. The bench of claim 14, wherein
the seat of the first bench includes a first end, a second end, a first rear corner area, and a second rear corner area, and at least a portion of an upper end of the third leg is positioned between the first end and the second end of the seat, an upper end of the first leg is adjacent the first rear corner area of the seat, and an upper end of the second leg is adjacent the second rear corner area of the seat, and
the seat of the second bench includes a first end, a second end, a first rear corner area, and a second rear corner area, and at least a portion of an upper end of the third leg is positioned between the first end and the second end of the seat, an upper end of the first leg is adjacent the first rear corner area of the seat, and an upper end of the second leg is adjacent the second rear corner area of the seat.

16. The bench system of claim 14, wherein the second bench includes a protrusion, the protrusion disposed adjacent to the console door of the first bench when the first bench and the second bench are in the stacked arrangement.

17. The bench system of claim 14, wherein an underside of the seat of the second bench abuts a top side of the seat of the first bench.

18. The bench system of claim 14, wherein the third leg of the second bench abuts the hollow interior of the third leg of the first bench.

* * * * *